J. M. COOLEY.
FLY TRAP.
APPLICATION FILED SEPT. 2, 1915.

1,190,117.

Patented July 4, 1916.
2 SHEETS—SHEET 1.

Inventor
J. M. Cooley,

Witnesses
J. H. Crawford.
D. V. Mahoney.

By Victor J. Evans
Attorney

J. M. COOLEY.
FLY TRAP.
APPLICATION FILED SEPT. 2, 1915.

1,190,117.  Patented July 4, 1916.
2 SHEETS—SHEET 2.

Witnesses  
J. H. Crawford  
D. V. Mahoney

Inventor  
J. M. Cooley,  
By Victor J. Evans  
Attorney

UNITED STATES PATENT OFFICE.

JOHN MORGAN COOLEY, OF FAYETTEVILLE, ARKANSAS.

FLY-TRAP.

1,190,117. Specification of Letters Patent. Patented July 4, 1916.

Application filed September 2, 1915. Serial No. 48,692.

*To all whom it may concern:*

Be it known that I, JOHN M. COOLEY, a citizen of the United States, residing at Fayetteville, in the county of Washington and State of Arkansas, have invented new and useful Improvements in Fly-Traps, of which the following is a specification.

This invention has reference to fly traps and is an improvement over my former Patent #1,102,141, dated June 30, 1914.

The primary object of this device is the provision of improved means for holding the auxiliary bottom in an open or closed position.

A further object is to facilitate the opening of the trap when it is desired to place the same in operative position.

A still further object is the provision of means consisting of a single piece of wire to support the trap in either an open or closed position.

With the foregoing and other objects in view, my invention resides in the construction, combination, and arrangement of parts described and claimed in the annexed specification and claims, the preferred embodiment of which is shown in the accompanying drawings.

Figure 1:
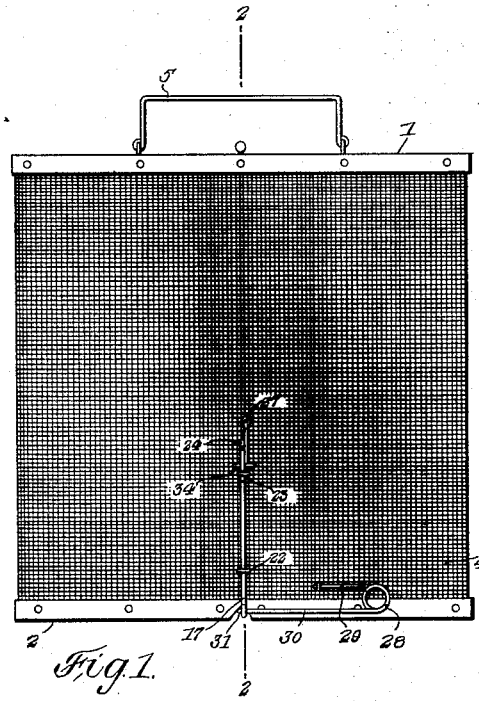
Figure 2:
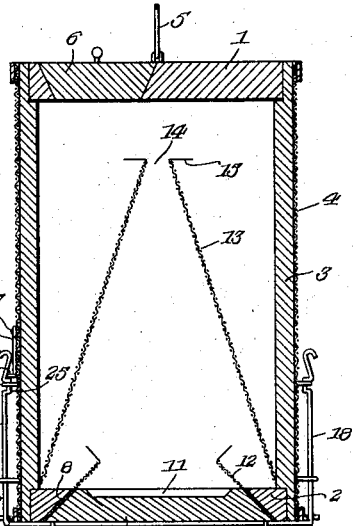
Figure 4:
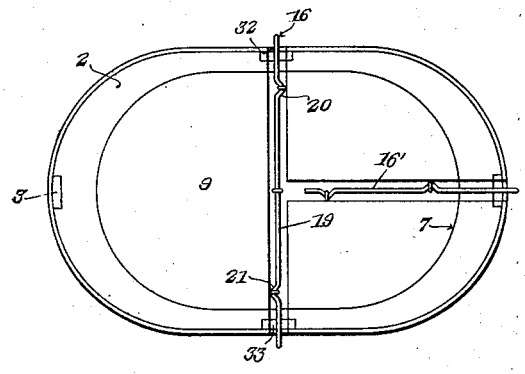
Figure 3:
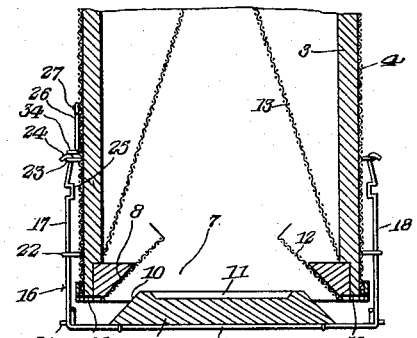
Figure 5:
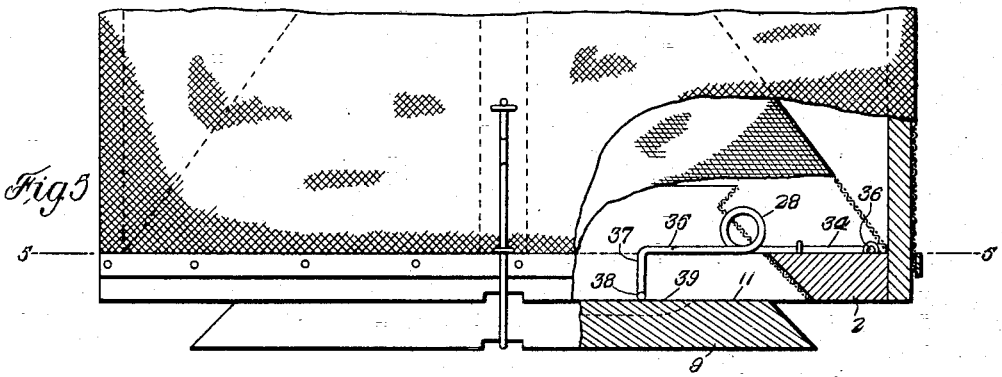
Figure 6:
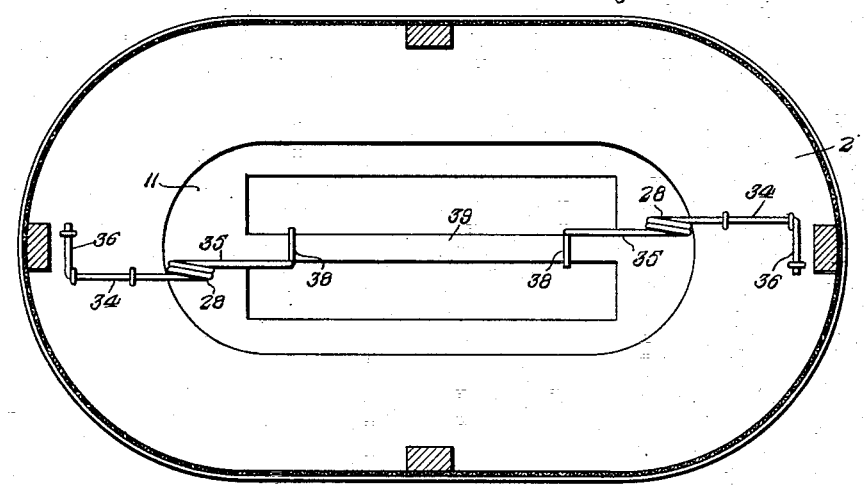
Figure 7:
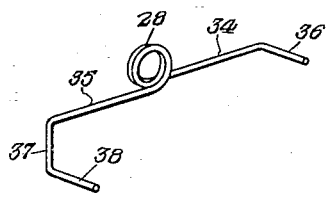
Figure 8:
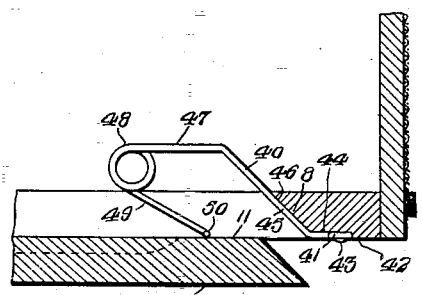

Referring to the drawings:—Figure 1 is a side view of the trap showing the bottom closed. Fig. 2 is a vertical sectional view taken on the line 2—2 of Fig. 1. Fig. 3 is a view similar to Fig. 2 showing the trap in an open position. Fig. 4 is a bottom plan view of the trap showing the additional supporting leg arranged thereon. Fig. 5 is a side elevation of the trap with a portion of the same broken away showing the modified construction of spring. Fig. 6 is a transverse sectional view taken on the line 5—5 of Fig. 5. Fig. 7 is a detailed view of the spring shown in Figs. 5 and 6. Fig. 8 is a sectional view showing a further modification of the spring.

Referring to the drawings by reference numerals in which like or corresponding parts are designated by the same numerals throughout the several views, the trap comprises a top 1 and a bottom 2 held in spaced relation by means of brace rods 3 or other suitable means. The walls of the trap comprise a foraminous screen 4 which is fastened to the top and bottom of the same. A foraminous screen is used as the most suitable for the purpose, but any other suitable material may be substituted for the same.

The top is provided with a handle 5 by means of which the trap is transported and a lid or cover 6, by means of which access to the interior of the trap is obtained.

The bottom of the trap is provided with an aperture 7, walls 8 of which are beveled. An auxiliary bottom 9 having correspondingly beveled walls is adapted to close the aperture in the bottom of the trap. The auxiliary bottom is used as a bait receptacle, as shown at 11. A guard or screen 12 is fastened to the interior of the beveled walls 8 of the apertured opening for a purpose hereinafter explained. Arranged within the trap is a cone-shaped screen 13 having an opening 14 in its upper end and through which the flies gain access to the interior of the trap. The opening 14 is provided with a peripheral flange 15 which prevents the flies from crawling up the surface of the cone and escaping through the opening. The guard or screen 12 prevents the flies from coming down the surface of the cone and escaping after they have once entered the trap.

The construction heretofore explained is similar to that shown in my former patent, and the improvements upon which I desire protection are improved means for supporting the auxiliary bottom. To this end I employ a wire member 16 which comprises the supporting legs 17 and 18 and the base portion 19. The base portion 19 is received in a transverse groove formed in the auxiliary bottom, and is provided with off-sets 20 and 21 which rigidly support the trap and prevent the same from swinging. The off-sets 20 and 21 may be of any number and may be constructed in any manner convenient to existing conditions. The trap is provided on each side with a pair of eyes 22 and 23. The lower eye forms a guide for the passage of the supporting leg, and the upper eye 23 is adapted to coöperate with the leg to hold the trap in an open or closed position. The terminal of the leg is formed with a hook 24, which because of the inherent resiliency of the wire will engage the eye 23 and prevent the auxiliary bottom from being opened farther than a predetermined distance, which is most suitable for the operation of the trap. Disposed below the hook 24 and arranged so as to hold the trap in a closed position is a shoulder 25 which is also adapted to coöperate with the eye 23. When the shoulder is engaged with the eye 23, the bottom of the trap is closed for transportation or any other purpose desired. On one side of the trap, I provide a locking member 26, which is pivoted at 27 and adapted to lock the trap in an open position and prevent the accidental closure of the same. This is accomplished by means of the coiled end 34 which abuts against the hook 24 and prevents the supporting leg from moving upward. When it is desired to close the trap the locking member 26 may be swung to one side allowing the supporting leg to be forced upward until the shoulder 25 is in engagement with the eye 23.

At the juncture of the supporting leg and the base portion 19, I provide automatic means for opening the trap when the shoulder 25 is released from engagement with the eye 23. In the illustration shown in the drawing, this automatic means comprises a coiled spring 28, one terminal 29 of which is rigidly connected to the bottom of the trap, while the other terminal 30 is provided with a hook 31 adapted to coöperate with the base portion 19 and to normally hold the trap in an open position. One of these springs is provided on each side of the trap and arranged on opposite sides of the longitudinal axis, whereby the two springs have a tendency to balance each other and to force the bottom outwardly, perpendicular to the bottom of the trap. The bottom of the trap is provided with grooves 32 and 33 through which the wire member is adapted to pass so that when the trap is closed the bottom is entirely flush, and may be placed upon any surface desired. The transverse groove in the auxiliary bottom, which is provided for the passage of the base portion 19, also allows the bottom of the trap to be entirely flush when the trap is in either an operative or inoperative position.

In Figs. 5, 6 and 7 I have shown a modified construction of the spring by means of which the trap is opened, in which one terminal is placed within the trap and adapted to bear against the upper surface of the bottom 2 and the other terminal bears against the surface 11, and tends to hold the trap in an open position. By reference to the drawing you will see that I provided a coil 28 similar to that shown in Fig. 1, one terminal 34 being extended toward the edge of the trap and the other terminal 35 extended in the opposite direction toward the center of the trap. The terminal 34 is provided with a lateral offset 36 by means of which the spring is permanently secured to the bottom 2. The other terminal 35 is bent at right angles to the plane on the bottom of the trap and extended downwardly as shown at 37. The terminal of the spring is then offset as shown at 38 and is adapted to bear against the rib 39 arranged on the surface 11 of the auxiliary bottom 9. One of these springs is arranged at each side of the trap as shown in the drawings. The offset 37 is so constructed as to normally hold the trap in an open position. When the trap is closed the spring is placed under tension and as soon as the catches on the side are released the spring automatically opens the trap.

In Fig. 8 wherein I have illustrated a further modification of the spring construction the terminal 40 of the spring is provided with a loop 41 and is fastened on the outside 42 to the bottom 2 by any suitable means 43. The terminal is adapted to lie in the groove 44 on the base of the trap and is bent as shown at 45 to be positioned in the groove 56 of the beveled wall 8. The angular bend 45 extends above the bottom of the trap and is then bent into a substantially horizontal plane and extended toward the center of the trap as shown at 47. The coil 48 is placed over the auxiliary bottom 9 and the other terminal of the spring 49 extends downwardly and outwardly and bears against the upper surface 11 of the auxiliary bottom. It is provided with a lateral offset 50 adapted to lie upon the base 11 of the auxiliary bottom 9, and to hold the trap in an open position.

My device may also be used as a trap for catching roaches or other crawling insects by closing the side which is not provided with the locking member and locking the other side in an open position. This will incline the trap so that the beveled walls 9 and 10 on one side are in contact with each other, whereas on the other side an opening is provided for the entrance of the insect. After it has entered the auxiliary bottom of the trap it will pass over the guard or screen 12 and into the trap in a similar manner to a fly.

It will be readily seen that the above construction produces a trap which is simple and cheap to manufacture, and which when in a closed position may be easily transported from place to place. The trap is easily opened by a slightly inward pressure on the terminal of either supporting leg, which releases the shoulder 25 from engagement with the eye 23 and the coiled spring 29 automatically opens the trap. The hook 24 engaging the eye 23 holds the trap in the desired open position.

It may sometimes be advisable to provide a plurality of supporting members 16, and in Fig. 4 of the drawing has been shown a slight modification in which an additional supporting leg 16′ is provided and arranged at right angles to the supporting leg 16. Any number of these members may be provided as is deemed necessary and best suited to the purpose and I do not desire to limit myself to any particular manner of applying the same to the trap.

What I claim and desire to secure by Letters-Patent is:—

1. A fly trap of the class described having an apertured bottom, an auxiliary bottom, the auxiliary bottom being provided with a transverse groove, a substantially U-shaped member disposed in said groove, the arms of the said member supporting the trap, a hook formed on the terminal of each arm, a shoulder formed on each arm near its extremity, means on the trap to coöperate with the hooks and shoulders to hold the trap in an open or closed position, and means to automatically open the trap.

2. A fly trap of the class described having an apertured bottom, an auxiliary bottom, legs carried by the auxiliary bottom to support the trap, shoulders formed upon the legs, and eyes carried by the trap to hold the trap in a closed position, and a locking member adapted to coöperate with one of the shoulders and eyes to prevent the opening of the trap.

3. A fly trap having an apertured bottom, an auxiliary bottom, means for supporting the auxiliary bottom in opened and closed position, and means for automatically opening the trap.

4. A fly trap having an apertured bottom, an auxiliary bottom, means for supporting the auxiliary bottom, and a coil spring having one terminal secured to the trap and the other terminal to the auxiliary bottom to hold the same in spaced relation.

In testimony whereof I affix my signature in presence of two witnesses.

JOHN MORGAN COOLEY.

Witnesses:
J. F. JOHNSON,
J. M. HAMILTON.

Copies of this patent may be obtained for five cents each, by addressing the "Commissioner of Patents, Washington, D. C."